US010271250B2

(12) United States Patent
Sen et al.

(10) Patent No.: US 10,271,250 B2
(45) Date of Patent: Apr. 23, 2019

(54) SELECTING A SUBSET OF ACCESS POINTS

(71) Applicant: Hewlett Packard Enterprise Development LP, Houston, TX (US)

(72) Inventors: Souvik Sen, Mountain View, CA (US); Anil Gupta, Shrewsbury, MA (US); Manfred R. Arndt, Folsom, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/327,119

(22) PCT Filed: Aug. 18, 2014

(86) PCT No.: PCT/US2014/051543
§ 371 (c)(1),
(2) Date: Jan. 18, 2017

(87) PCT Pub. No.: WO2016/028262
PCT Pub. Date: Feb. 25, 2016

(65) Prior Publication Data
US 2017/0181045 A1    Jun. 22, 2017

(51) Int. Cl.
*H04W 36/00* (2009.01)
*H04W 48/16* (2009.01)
*H04W 48/20* (2009.01)
*H04W 88/12* (2009.01)
*H04B 17/318* (2015.01)
(Continued)

(52) U.S. Cl.
CPC ...... *H04W 36/0094* (2013.01); *H04B 17/318* (2015.01); *H04W 4/027* (2013.01); *H04W 4/029* (2018.02); *H04W 36/30* (2013.01); *H04W 36/32* (2013.01); *H04W 48/16* (2013.01); *H04W 48/20* (2013.01); *H04W 52/322* (2013.01); *H04W 52/386* (2013.01); *H04W 88/12* (2013.01); *H04W 48/04* (2013.01)

(58) Field of Classification Search
CPC .................... H04W 36/0094; H04B 17/318
USPC ..... 455/436, 440, 441, 442, 443, 452.2, 453
See application file for complete search history.

(56) References Cited

U.S. PATENT DOCUMENTS 5,982,758 A * 11/1999 Hamdy ............ H04W 36/0061
370/331
7,826,428 B2   11/2010 Malik et al.
(Continued)

FOREIGN PATENT DOCUMENTS

KR          20140089206         7/2014

OTHER PUBLICATIONS

Chen, Y-C et al, "Heterogeneity aware Load Balancing for Multimedia Access Over Wireless LAN hotspots", Jan 23, 2010.
(Continued)

*Primary Examiner* — Chuck Huynh
(74) *Attorney, Agent, or Firm* — Hewlett Packard Enterprise Patent Department

(57) ABSTRACT

Described herein are techniques for selecting a subset of access points. In an example, time-of-flight information and signal strength information associated with a device may be received from multiple access points. A subset of the access points may be selected based on the time-of-flight information, signal strength information, and load information. The subset of access points may be instructed to respond to a probe request from the device.

14 Claims, 6 Drawing Sheets

(51) Int. Cl.
    *H04W 4/029*     (2018.01)
    *H04W 4/02*     (2018.01)
    *H04W 36/30*     (2009.01)
    *H04W 36/32*     (2009.01)
    *H04W 52/32*     (2009.01)
    *H04W 52/38*     (2009.01)
    *H04W 48/04*     (2009.01)

(56) References Cited

U.S. PATENT DOCUMENTS

| | | | |
|---|---|---|---|
| 8,135,412 | B2 | 3/2012 | Theobold et al. |
| 8,254,347 | B2 | 8/2012 | Bejerano et al. |
| 2008/0102852 | A1 | 5/2008 | Du et al. |
| 2009/0137249 | A1 | 5/2009 | Horn et al. |
| 2010/0322198 | A1* | 12/2010 | Friday .................. H04W 48/20 370/332 |
| 2014/0022918 | A1 | 1/2014 | Guo et al. |

OTHER PUBLICATIONS

PCT; "Notification of Transmittal of the International Search Report and the Written Opinion of the International Searching Authority, or the Declaration"; cited in Appl. No. PCT/US2014/051543: dated May 14, 2015; 12 pages.

Wu et al., "Footprint: cellular assisted Wi-Fi AP discovery on mobile phones for energy saving," In Wintech 2009, Sep. 2009, pp. 67-76.

Ravindranath et al., "Improving wireless network performance using sensor hints," In USENIX NSDI, 2011, pp. 281-294.

Ramani et al., "SyncScan: Practical Fast Handoff for 802.11 Infra-structure Networks," In INFOCOM 2005, Mar. 2005, 10 Pages.

Kim et al., "Improving energy efficiency of Wi-Fi sensing on smartphones," in INFOCOM, 2011, 9 Pages.

* cited by examiner

SELECTING A SUBSET OF ACCESS POINTS

BACKGROUND

Devices with wireless cards may perform channel scans to find available wireless access points to connect to. In general, the device itself is responsible for deciding which access point with which to associate. There are various techniques for deciding which access point to connect to, which can be based on various factors. An example factor is the signal strength of the access point. However, devices sometimes do not choose the most appropriate access point for association. As a result, the quality of wireless service to the device and/or to other devices can be degraded for various reasons, such as due to certain access points becoming overloaded and throughput decreasing. Additionally, after association with an access point, sometimes the device will stay connected to that access point even when other, more appropriate access points become available.

BRIEF DESCRIPTION OF DRAWINGS

The following detailed description refers to the drawings, wherein.

DETAILED DESCRIPTION

In an example, a method may be provided to select a subset of access points for potential association by a device, which may be a mobile device. The method can be performed by a wireless local area network controller. The method can include receiving, from multiple access points, time-of-flight information and signal strength information associated with the mobile device. A subset of the multiple access points may be identified based on the time-of-flight information, the signal strength information, and load information of each access point.

The time-of-flight information may be used as a proxy or estimate of a distance of the mobile device from a particular access point. By selecting an access point closer to the mobile device, the wireless connection may be more consistent and the throughput of the mobile device may be increased since signals do not need to traverse as large a distance. The signal strength information may be used to ensure that a sufficiently strong wireless connection can be maintained. The load information, which may be provided to the controller by the access points, may be used to ensure proper load balancing over the access points. The method may then include instructing the subset of the multiple access points to respond to a probe request of the mobile device. Additionally, the access points not in the subset may be instructed to refrain from responding to a probe request of the mobile device.

As a result, the controller may ensure that only a select group of access points are available for association with the mobile device. This can ensure better wireless service to the mobile device as well as to other devices in the wireless local area network. Additionally, as will be described in more detail later, an access point may be selected based on a mobility state determined for the mobile device. Based on the mobility state, access points may be selected to ensure a high throughput or to minimize the number of handoffs (i.e., the number of times that the device changes access points) while maintaining a minimum level of signal strength. Additional examples, advantages, features, modifications and the like are described below with reference to the drawings.

FIGS. 1-4 illustrate methods usable to select a subset of access points for potential association with a device, according to various examples. Methods 100-400 may be performed by a computing device or computer, such as controller 560, and computer 710. Computer-readable instructions for implementing methods 100-400 may be stored on a computer readable storage medium. These instructions as stored on the medium are referred to herein as "modules" and may be executed by a computer.

Figure 5:
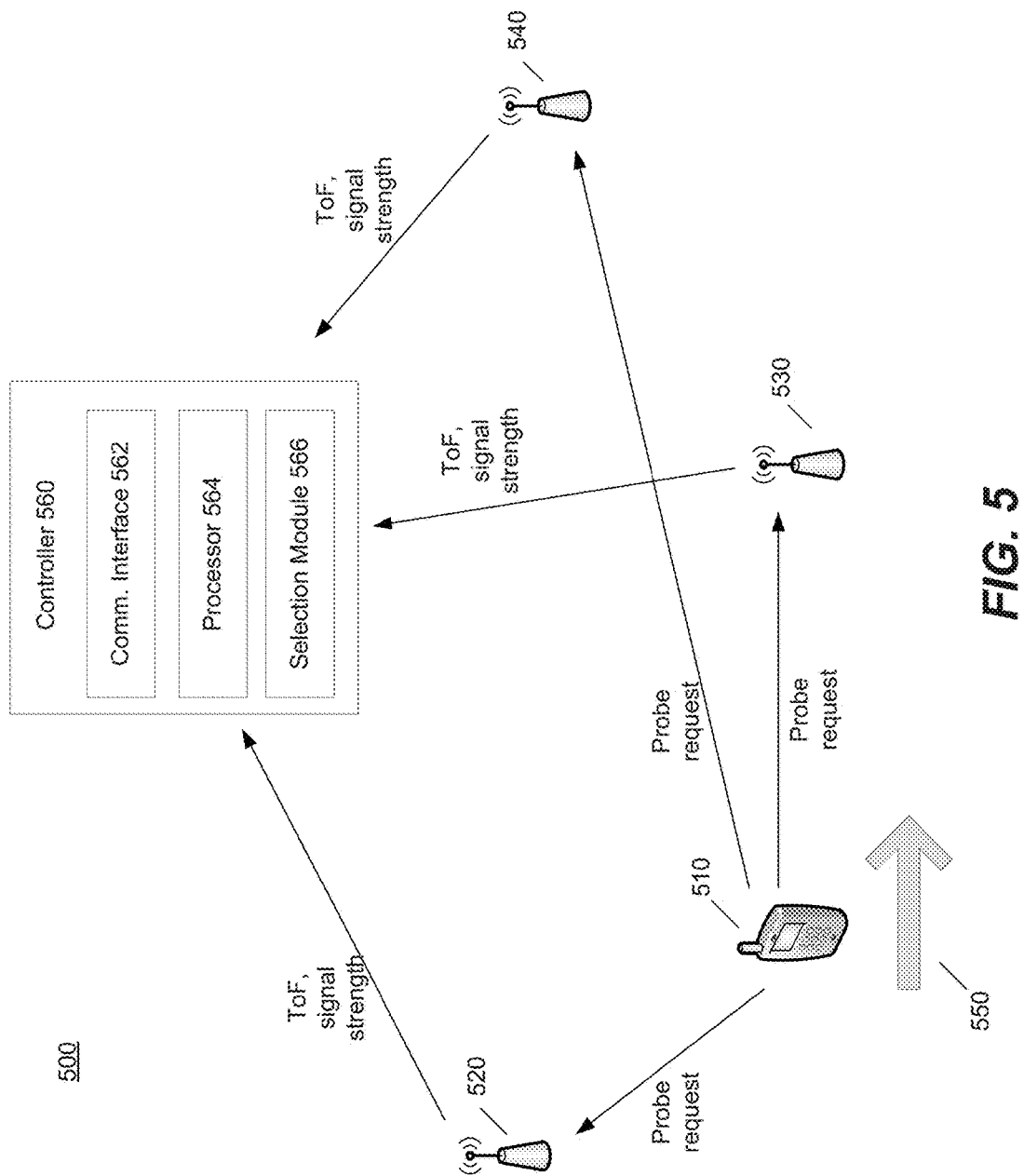
FIG. 5 illustrates a controller to select a subset of access points for potential association with a device, according to an example.

Methods 100-400 will be described here relative to environment 500 of FIG. 5. Environment 500 may include a mobile device 510, various access points 520-540, and a controller 560. Mobile device 510 may be a mobile phone, smartphone, tablet computer, laptop computer, or the like, and may include wireless access capability, such as through a wireless card. Controller 560 may be a wireless local area network (WLAN) controller. Controller 560 may include a communication interface 562 for communicating with APs 520-540, a processor 564, and a selection module 566, which can be executed by processor 564. Selection module 566 may be configured to perform methods 100-400, or aspects thereof, and/or instructions 732-736 of FIG. 7. Access points (APs) 520-540 may be wireless access points that provide wireless network access to devices. The APs may implement known wireless networking protocols, such as IEEE 802.11 variations.

Mobile device 510, APs 520-540, and controller 560 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, mobile device 510, APs 520-540, and controller 560 may include one or more machine-readable storage media separate from the one or more controllers.

Figure 1:
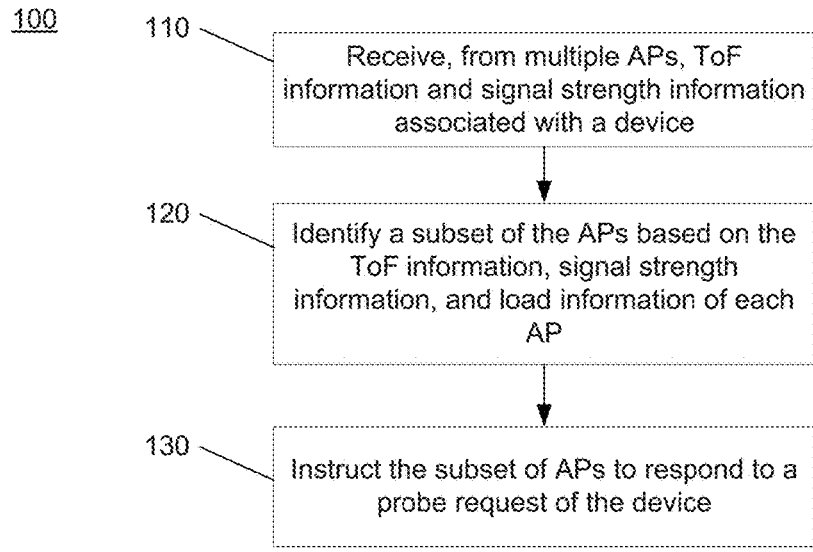
FIG. 1 illustrates a method to select a subset of access points for potential association with a device, according to an example.

Turning to FIG. 1, method 100 may be used to select a subset of APs, according to an example. For illustration, method 100 will be described as executed by controller 560. Method 100 may begin at 110, where controller 560 may receive, from multiple APs, time-of-flight (ToF) information and signal strength information associated with mobile device 510. APs 520-540 may have been triggered to obtain and transmit these values to controller 560 based on having received a probe request from mobile device 510.

The ToF may capture the propagation delay between a transmitter, such as at one of APs 520-540, and a receiver, such as at mobile device 510, and vice versa. For example, AP 520 may send a message to mobile device 510. The message may be a 802.11 NULL data frame. For instance, AP 520 may send a 802.11 NULL data frame that includes an 802.11 frame control field, type 10 and subtype 0100 or a 802.11 QoS NULL data frame that includes an 802.11 frame control field, type 10 and subtype 1100. The mobile device 510, even if it is not associated with AP 520, may reply with an acknowledgement (ACK), for example, as specified in the IEEE 802.11 standard. Thus, AP 520 may receive an acknowledgement, which acknowledges mobile device 510 having received the message. AP 520 may calculate a ToF value based on an elapsed period between sending the message and receiving the acknowledgement. Each AP may perform this technique to obtain ToF information to send to controller 560.

Figure 6:
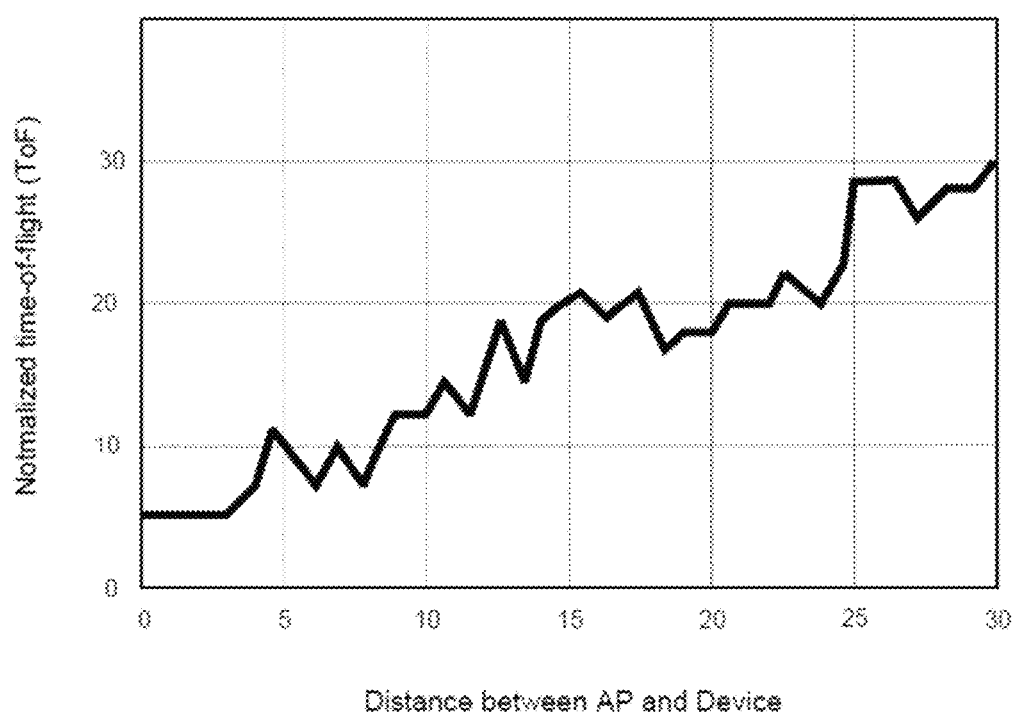
FIG. 6 illustrates normalized time-of-flight values between an access point and a device, according to an example.

The ToF may be used as a proxy for or estimate of the distance between the AP and the mobile device. To illustrate this, FIG. 6 depicts normalized ToF values between an AP and a device communicating with the AP, according to an example. The ToF is proportional to the distance between a transmitter (e.g., at the device 510 or one of the APs) and a receiver (e.g., at the other one of the APs or the device 510). Thus, a ToF measurement, or multiple such measurements, may be used as an indication of the distance between the AP and the mobile device. For example, a ToF between AP 520 and mobile device 510 would generally be shorter than a ToF between AP 530 or AP 540 and mobile device 510, reflecting the relatively shorter distance. Similarly, a ToF between AP 530 and mobile device 510 would generally be shorter than a ToF between AP 540 and mobile device 510. Accordingly, using this ToF information relative distances of the mobile device 510 from the various APs may be estimated.

The signal strength information may be a measure of the received signal strength indicator (RSSI) value between one of APs 520-540 and mobile device 510. RSSI is the relative received signal strength in a wireless environment and is an indication of the power level being received by an antenna. The higher the RSSI number, the stronger the signal. Strong signal strength can result in a higher throughput and a more consistent wireless session quality. In some examples, other signal strength indicators may be used, such as received channel power indicator (RCPI) values.

At 120, controller 560 may identify a subset of the APs for potential association with the mobile device 510. In selecting APs for the subset, the controller 560 may consider various information. For example, based on the ToF information and signal strength information, the controller may make an informed decision regarding which APs would be most appropriate for the mobile device 510. Load information of the various APs may additionally be considered. This information may be considered individually and in combination with each other. The subset of APs may include as few as one AP and as many as all of the APs.

The controller 560 can use the ToF information to exclude an access point from the subset. As an example, if the ToF information indicates a ToF (e.g., average ToF, median ToF, etc.) equal to or above a threshold value, the AP can be excluded from (i.e., not included in) the subset. As another example, the controller can rank the APs by ToF (e.g., low rank=small ToF) and exclude from the subset a certain number of APs with higher ranks. By selecting an access point closer to the mobile device, the wireless connection may be more consistent and the throughput of the access point may be increased since signals do not need to traverse as large a distance. Furthermore, as will be described later with respect to FIGS. 2-4, ToF information may influence membership of the subset as far as it can be used as an indication of a mobility state of the mobile device 510 relative to an AP.

The controller 560 can use the signal strength information to exclude an access point from the subset. Similar to ToF, APs with signal strength information indicating signal strengths below a threshold may be excluded from the subset. Alternatively, the controller can rank the APs by signal strength (e.g., low rank=high signal strength) and exclude from the subset a certain number of APs with higher ranks.

Additionally, controller 560 may consider load information when identifying the subset of APs. Load information for an AP may indicate a workload on the AP. The workload may include the number of devices connected to the AP, an available bandwidth of the AP, and a throughput of the AP. In general, it can be beneficial to spread workload over all available APs. This can result in better service to all connected devices and higher throughput. The load information may be provided to the controller 560 on a regular basis by the APs 520-540. Additionally, controller 560 may track AP load over time. Thus, based on the load information, controller 560 may exclude certain APs that are determined to have a heavier load. For example, APs with lower throughputs may be excluded from the subset.

At 130, the controller 560 may instruct the subset of APs to respond to a probe request of the mobile device 510. The controller 560 may also instruct the APs not in the subset to refrain from responding to the probe request of the mobile device 510. As a result, the controller 560 is able to influence which APs respond to mobile device 510's request for available APs, and thus may influence to which AP the mobile device 510 ultimately connects. For example, if only AP 530 were in the subset after the above analysis, then only AP 530 would send a probe response. As a result, mobile device 510 would only be able to associate with AP 530. Controller 560 thus prevented mobile device 510 from associating with AP 520 or AP 540. In this fashion, controller 560 may ensure higher quality wireless service in the WLAN despite the association algorithm that mobile device 510 employs.

Figure 2:
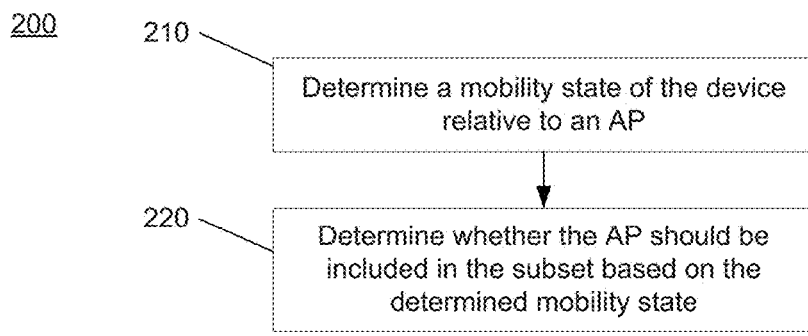
FIG. 2 illustrates a method to determine whether an access point should be included in a subset based on a determined mobility state of a device, according to an example.
Figure 3:
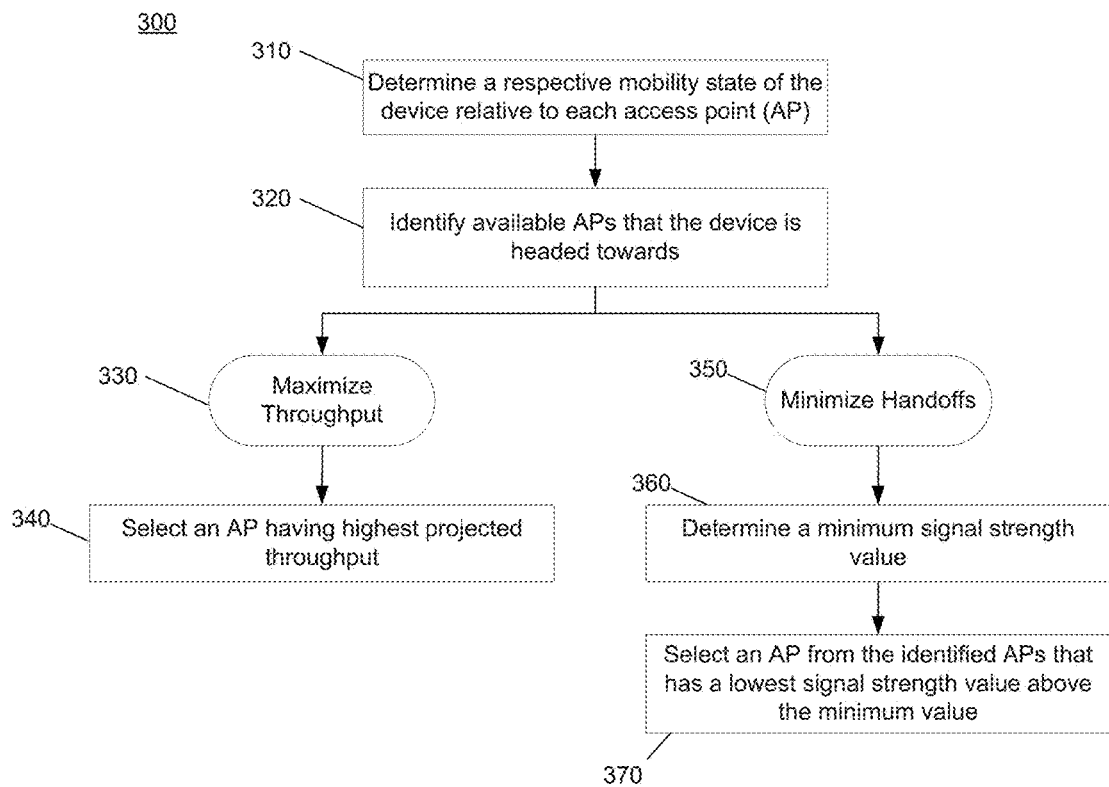
FIG. 3 illustrates a method to perform a network assisted handover, according to an example.

FIG. 2 illustrates a method 200 for determining whether an AP should be included in the subset based on a determined mobility state of the device, according to an example. At 210, controller 560 may determine a mobility state of device 510 relative to an AP. In some examples, the AP may determine the mobility state of the device and provide the determined mobility state as part of the ToF information.

The mobility state may be determined based on ToF information received from the AP, where the ToF information includes multiple ToF measurements over time. The ToF information may be used to determine (1) whether device 510 is static (i.e., stationary/not moving) or mobile (i.e., moving), (2) a directional heading of device 510 relative to the AP (i.e., whether the device is approaching or moving away from the AP), and (3) a velocity of device 510 relative to the AP.

For example, if the ToF is not changing over time, it may be determined that device 510 is static. If the ToF is changing, it may be determined that device 510 is mobile. Note that a threshold may be used to determine a mobile vs. static state. For example, some variation in ToF over time may be allowed to account for deviations in ToF due to minor movement, environmental conditions, or the like. Once the threshold is met, however, it may be assumed that the deviations are significant enough that the device 510 is indeed moving a significant amount. In addition, if the ToF is increasing (e.g., see FIG. 6), it may be determined that the device 510 is heading away from the AP. Otherwise if the ToF is decreasing, it may be determined that the device 510 is approaching the AP. Finally, velocity of the device 510 relative to the AP may be determined using the following equation: $v=\text{ToF1}-\text{ToF2}/t2-t1$, where v is the velocity, ToF1 is a first ToF, ToF2 is a second ToF, t1 is the time when a first message was sent for determining ToF1, and t2 is the time when a second message was sent for determining ToF2. A positive velocity would indicate velocity toward the AP while a negative velocity would indicate velocity away from the AP. Multiple successive determinations of ToF over time can be performed to confirm the correctness of the determined mobility state.

At 220, controller 560 may determine whether a particular AP should be included (or excluded) in the subset based on the determined mobility state of the device 510 relative to the particular AP. For example, if the directional heading indicates that the mobile device is moving away from the AP, such as shown in FIG. 5 where mobile device 510 is moving away from AP 520 as indicated by arrow 550, the AP may be excluded from the subset. In another example, the AP 520 may be excluded from the subset only if the velocity is above a threshold value. This may allow for association with AP 520 despite the directional heading of mobile device 510 in the case where a sufficiently long connection of a certain quality may nonetheless be maintained due to a low velocity. In other examples, additional factors as described with respect to FIG. 3 may be considered in deciding which APs to exclude or include in the subset.

Method 300 may begin at 310, where a respective mobility state of device 510 relative to each available AP may be determined. For example, referring to environment 500, the mobility state of device 510 may be determined relative to each of AP 520, AP 530, and AP 540. Thus, for AP 520, it may be determined that device 510 is mobile, is moving away from AP 520, and is moving at velocity X relative to AP 520. For AP 530, it may be determined that device 510 is mobile, is moving toward AP 530, and is moving at velocity Y relative to AP 530. For AP 540, it may be determined that device 510 is mobile, is moving toward AP 540, and is moving at velocity Z relative to AP 540. Note that the determined velocity relative to each AP may differ due to the different locations of the APs.

At 320, available APs that device 510 is headed towards may be identified. For example, APs 530 and 540 may be identified as available APs in this regard. AP 520 would not be identified because device 510 is moving away from AP 520. After 320, a selection technique may be chosen to select one or more of the identified available APs. Two example selection techniques are a selection technique that attempts to maximize throughput (330) and a selection technique that attempts to minimize the number of handoffs (360).

For the maximize throughput selection technique (330), method 300 may proceed to 340 where an AP (from the APs identified in block 320) having the highest projected throughput may be selected for the subset. The throughput may be projected based on various criteria, such as signal strength of the AP, load, and the 802.11 protocol that is supported by the AP. In some examples, multiple high throughput APs may be selected. Referring to environment 500, AP 530 would likely be selected using this selection technique because AP 530 is closer to device 510 and thus probably would have a higher signal strength than AP 540 and, thus, a higher projected throughput. The maximize throughput selection technique may be useful for when device 510 is executing an application requiring high throughput, such as a bulk transfer application (e.g., file download/upload, video or audio download/upload, etc.). However, if device 510 hasn't recently associated with one of the APs, this information may not be known.

For the minimize handoffs selection technique (350), method 300 may select an AP (or multiple APs) that is expected to provide the longest lasting viable connection (i.e., a connection likely to provide at least the minimum signal strength for the longest period of time). At 360, a minimum signal strength value may be determined. The minimum signal strength value may be a minimum signal strength value that is deemed acceptable for connection purposes. The minimum value may be a set, predetermined value. Alternatively, the minimum value may be dependent on the type of application being executed on device 510 or on the bandwidth requirements of an application being executed on device 510. Again, this information may not be known if device 510 has not recently associated with one of the APs.

At 370, an AP may be selected (from the APs identified in block 320) for the subset, where the AP has a lowest signal strength value above the minimum value. Referring to environment 500, assuming AP 540 has a signal strength above the minimum value, AP 540 would likely be selected using this selection technique because AP 540 is farther from device 510 and would thus likely have a weaker signal strength than AP 530. The reason that selection of AP 540 may minimize the number of handoffs is because device 510 would probably be able to stay associated with AP 540 for a longer period of time than with AP 530 due to the mobility direction of device 510. In other words, by associating with AP 540, device 510 may put off having to re-associate with a new AP because the connection with AP 540 should be viable for a longer period of time than it would have been with AP 530. The minimize handoffs selection technique may be used when device 510 is executing an application that is sensitive to latency or jitter, such as a real-time application involving audio or video conferencing. In such case, interrupting the connection for channel scans may result in degraded performance, so a longer lasting connection would be preferred.

In some examples, multiple APs having a lower signal strength value above the minimum value may be selected for the subset. Additionally, in some examples the ToF information may be used instead of signal strength for determining the farthest AP in the right direction. In such a case, signal strength information could still be checked to ensure at least the minimum signal strength. Finally, note that all of the various criteria as described herein may be considered together in determining which APs to include in or exclude from the subset.

Figure 4:
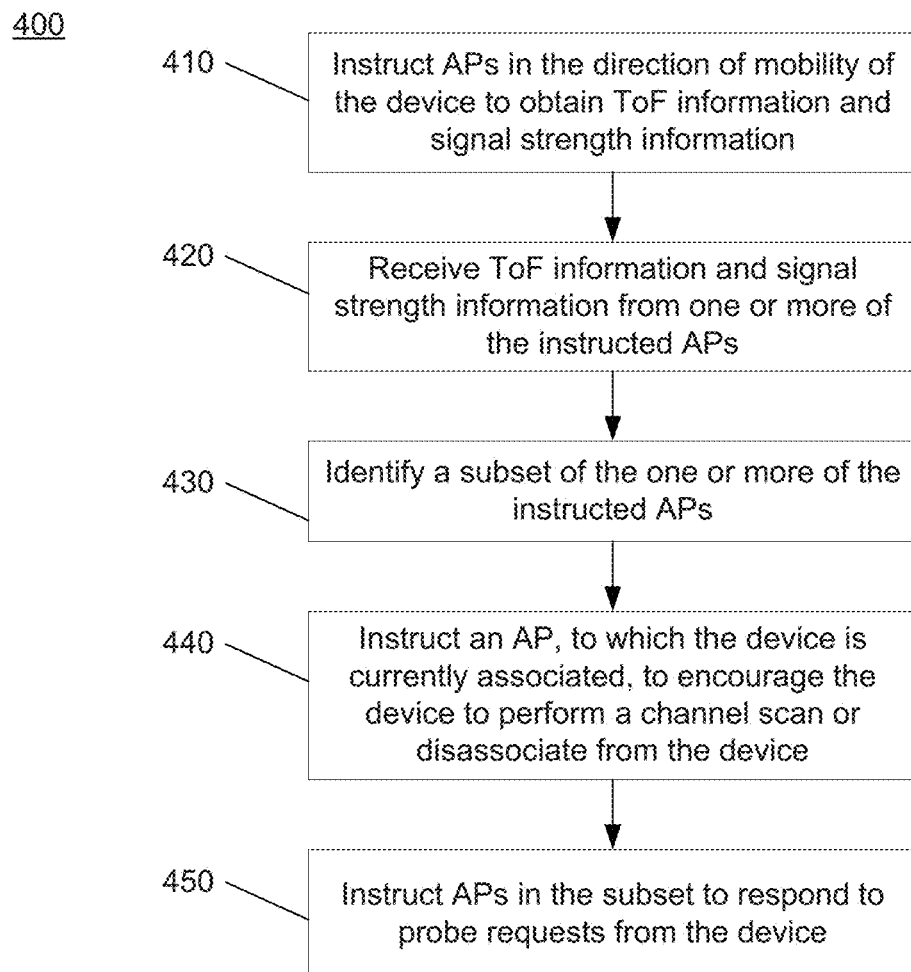
FIG. 4 illustrates a method to identify and select an access point according to a selection technique, according to an example.

FIG. 4 illustrates a method 400 to perform a network assisted handover, according to an example. Method 400 may be used to deal with the problem of a sticky client, where the client does not roam and/or associate with a new AP despite the new AP having the capability to provide better service. Additionally, method 400 takes advantage controller 560's knowledge regarding mobile device 510's mobility state. In this illustrative example, it is assumed that mobile device 510 is currently associated with AP 520 and that mobile device 510's mobility state is known due to prior interaction. If mobile device 510's mobility state were static, controller 560 may elect not to perform method 400 since the likelihood of finding a better AP might be lower.

At 410, controller 560 may instruct APs in the direction of mobility of mobile device 510 to obtain ToF information and signal strength information. Thus, for example, controller 560 may instruct AP 530 and AP 540 to obtain new ToF measurements and signal strength measurements since APs 530 and 540 are in the direction 550 of mobile device's motion. At 420, controller 560 may receive the ToF information and signal strength information from one or more of the instructed APs. It will be assumed that information is received from both AP 530 and AP 540. At 430, controller 560 may identify a subset of the one or more of the instructed APs. The subset may be identified using the same techniques as described above.

At 440, controller 560 may instruct the AP to which the device is currently associated, AP 520, to encourage mobile device 510 to perform a channel scan. For instance, AP 520 may achieve this by sending a BSS transition management request. If the mobile device 510 does not perform a channel scan in response, AP 520 can disassociate from mobile device 510 so as to force mobile device 510 to perform a channel scan if it wants to maintain wireless connectivity. Yet another method to encourage the mobile device 510 to perform a channel scan could be to reduce the transmit power of unicast packets sent by AP 520 towards mobile device 510. Transmit power for other client devices associated to AP 520 is not reduced. At 450, controller 560 may instruct the APs in the subset to respond to probe requests from the mobile device 510. Controller 560 may further instruct the APs not in the subset to refrain from responding to probe requests from the mobile device 510. As a result, a network assisted handover to a specific AP (or to one of a group of specific APs) is accomplished.

Figure 7:
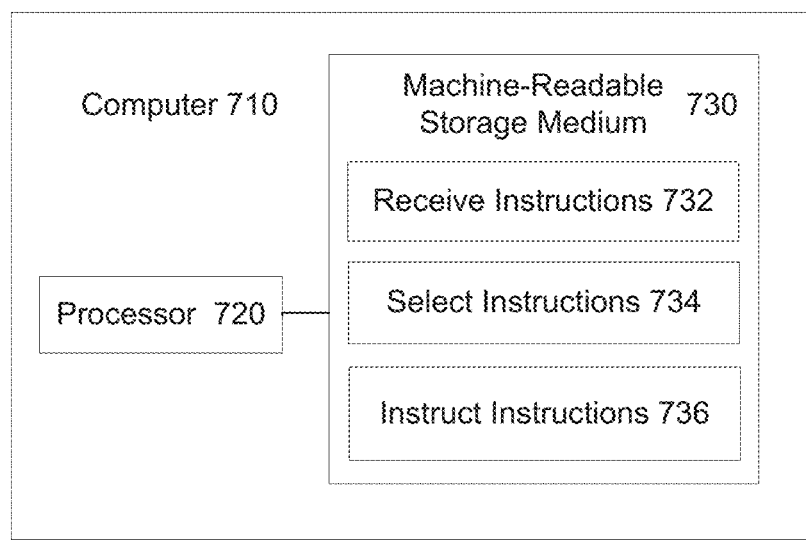
FIG. 7 illustrates a computer-readable medium to select a subset of access points for potential association with a device, according to an example.

FIG. 7 illustrates a computer-readable medium to select a subset of access points for potential association with a device, according to an example. Computer 710 may be a computing device such as controller 560. The computer may include one or more controllers and one or more machine-readable storage media, as described with respect to controller 560, for example.

Processor 720 may be at least one central processing unit (CPU), at least one semiconductor-based microprocessor, other hardware devices or processing elements suitable to retrieve and execute instructions stored in machine-readable storage medium 730, or combinations thereof. Processor 720 can include single or multiple cores on a chip, multiple cores across multiple chips, multiple cores across multiple devices, or combinations thereof. Processor 720 may fetch, decode, and execute instructions 732-736 among others, to implement various processing. As an alternative or in addition to retrieving and executing instructions, processor 720 may include at least one integrated circuit (IC), other control logic, other electronic circuits, or combinations thereof that include a number of electronic components for performing the functionality of instructions 732-736. Accordingly, processor 720 may be implemented across multiple processing units and instructions 732-736 may be implemented by different processing units in different areas of computer 710.

Machine-readable storage medium 730 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 730 can be computer-readable and non-transitory. Machine-readable storage medium 730 may be encoded with a series of executable instructions for managing processing elements.

The instructions 732-736 when executed by processor 720 (e.g., via one processing element or multiple processing elements of the processor) can cause processor 720 to perform processes, for example, methods 100-400, and/or variations and portions thereof.

For example, receive instructions 732 may cause processor 720 to receive from each of a plurality of access points time-of-flight information associated with a device, signal strength information associated with the device, and load information associated with the respective access point. Select instructions 734 may cause processor 720 to select a subset of the access points based on the time-of-flight information, the signal strength information, and the load information. Instruct instructions 736 may cause processor 720 to instruct access points not in the subset to refrain from responding to a probe request of the device. Additionally, instruct instructions 736 may cause processor 720 to instruct access points in the subset to respond to a probe request of the device.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method for selecting a subset of access points, comprising, by a processor:
receiving, from multiple access points, time-of-flight information and signal strength information associated with a mobile device;
determining a respective mobility state of the mobile device relative to each access point based on the time-of-flight information;

identifying, based on the determined mobility states, access points that the mobile device is headed towards;
identifying a subset of the multiple access points based on the time-of-flight information, the signal strength information, and load information of each access point to minimize a number of handoffs by inclusion of an access point in the subset that has a lowest signal strength value above the minimum signal strength value from the identified access points that the device is headed towards;
instructing the subset of the multiple access points to respond to a probe request of the mobile device.

2. The method of claim 1, further comprising instructing the access points not in the subset to refrain from responding to the probe request of the mobile device.

3. The method of claim 1, wherein the subset of the multiple access points is identified based at least in part on:
not including at least one of the access points in the subset due to the time-of-flight information received from the at least one of the access points.

4. The method of claim 1, wherein not including at least one of the access points in the subset due to the time-of-flight information received from the at least one of the access points comprises:
only including access points in the subset whose time-of-flight information is below a threshold.

5. The method of claim 1, wherein the subset of the multiple access points is identified based at least in part on:
not including at least one of the access points in the subset due to the load information of the at least one of the access points.

6. The method of claim 1, wherein the subset of the multiple access points is identified based at least in part on:
not including at least one of the access points in the subset due to the signal strength information associated with the mobile device received from the at least one of the access points.

7. The method of claim 1, wherein identifying a subset of the multiple access points further comprises:
determining a mobility state of the mobile device relative to at least one of the access points based on the time-of-flight information received from the at least one of the access points; and
determining whether at least one of the access points should be in the subset based on the determined mobility state.

8. The method of claim 7, wherein the mobility state of the mobile device relative to an access point comprises a velocity and a directional heading,
the velocity being determined based on the following equation:

$$v = ToF1 - ToF2/t2 - t1,$$

where v is the velocity, ToF1 is a first time-of-flight calculated based on an elapsed period between sending a first message and receiving a first acknowledgement from the mobile device, ToF2 is a second time-of-flight based on an elapsed period between sending a second message and receiving a second acknowledgement from the mobile device, t1 is a first time at which the first message was sent, and t2 is a second time at which the second message was sent, and
the directional heading being determined to be toward the access point if the velocity is positive and away from the access point if the velocity is negative.

9. The method of claim 7, further comprising:
after association of the mobile device with a first access point in the subset:
instructing access points in a direction of mobility of the mobile device to obtain time-of-flight information and signal strength information associated with the mobile device;
receiving time-of-flight information and signal strength information from one or more of the instructed access points;
identifying a second subset of the one or more of the instructed access points based on the time-of-flight information, signal strength information, and load information of the one or more of the instructed access points;
instructing the first access point to encourage the mobile device to perform a channel scan or to disassociate from the mobile device; and
instructing the access points in the second subset to respond to probe requests from the mobile device.

10. The method of claim 9, further comprising instructing any access points not in the second subset that receive a probe request from the mobile device to refrain from responding to the probe request of the mobile device.

11. The method of claim 9, wherein instructing the first access point to encourage the mobile device to perform a channel scan comprises instructing the first access point to send a BSS transition management request or reducing the transmit power of unicast packets towards the mobile device.

12. A wireless local area network controller, comprising:
a communication interface to send and receive data to and from multiple access points; and
a processor to:
receive from the access points time-of-flight information and signal strength information associated with a mobile device;
determine a respective mobility state of the mobile device relative to each access point based on the time-of-flight information;
identify, based on the determined mobility states, access points that the device is headed towards;
select a subset of the access points based on the time-of-flight information, the signal strength information, and load information of each access point to minimize a number of handoffs by inclusion of an access point in the subset that has a lowest signal strength value above the minimum signal strength value from the identified access points that the device is headed towards; and
instruct the subset of the access points to respond to a probe request of the mobile device.

13. The controller of claim 12, wherein the processor is to choose a selection technique from a plurality of selection techniques based on bandwidth requirements of an application executing on the mobile device, based on a type of an application executing on the mobile device, or based on a pattern of mobility of the mobile device.

14. A non-transitory computer-readable storage medium storing instructions for execution by a processor, the instructions when executed causing the processor to:
receive from a plurality of access points time-of-flight information associated with a device, signal strength information associated with the device, and load information associated with the respective access point;

determine a respective mobility state of the mobile device relative to each access point based on the time-of-flight information;
identify, based on the determined mobility states, access points that the device is headed towards;
select a subset of the access points based on the time-of-flight information, the signal strength information, and the load information to minimize a number of handoffs by inclusion of an access point in the subset that has a lowest signal strength value above the minimum signal strength value from the identified access points that the device is headed towards; and
instruct access points in the subset to respond to a probe request of the device.

* * * * *